US012209595B2

(12) United States Patent
Niemiec et al.

(10) Patent No.: US 12,209,595 B2
(45) Date of Patent: *Jan. 28, 2025

(54) STEPPED LEADING EDGE FAN BLADE

(71) Applicant: Go Fan Yourself, LLC, Schaumburg, IL (US)

(72) Inventors: Darrin Walter Niemiec, Schaumburg, IL (US); James C. Muth, Schaumburg, IL (US); Patrick Todd Woodzick, Schaumburg, IL (US); William J. Carlson, Schaumburg, IL (US)

(73) Assignee: Go Fan Yourself, LLC, Long Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,071

(22) Filed: Jul. 10, 2023

(65) Prior Publication Data

US 2023/0349389 A1 Nov. 2, 2023

Related U.S. Application Data

(63) Continuation of application No. 17/521,037, filed on Nov. 8, 2021, now Pat. No. 11,698,081, which is a continuation of application No. 16/569,010, filed on Sep. 12, 2019, now Pat. No. 11,168,703, which is a continuation of application No. 14/814,161, filed on Jul. 30, 2015, now Pat. No. 10,428,831.

(51) Int. Cl.

| | |
|---|---|
| ***F04D 29/38*** | (2006.01) |
| ***F04D 19/00*** | (2006.01) |
| ***F04D 25/06*** | (2006.01) |
| ***F04D 25/08*** | (2006.01) |
| ***F04D 29/02*** | (2006.01) |

(52) U.S. Cl.

CPC ......... *F04D 29/384* (2013.01); *F04D 19/002* (2013.01); *F04D 25/06* (2013.01); *F04D 25/088* (2013.01); *F04D 29/023* (2013.01); *F05D 2240/303* (2013.01)

(58) Field of Classification Search

CPC ..... F04D 25/088; F04D 29/384; F04D 29/281

See application file for complete search history.

(56) References Cited

U.S. PATENT DOCUMENTS 6,244,821 B1 * 6/2001 Boyd .................... F04D 25/088 416/223 R 11,698,081 B2 * 7/2023 Niemiec ............... F04D 29/384 417/423.1

FOREIGN PATENT DOCUMENTS

JP 2006009699 A * 1/2006

* cited by examiner

*Primary Examiner* — Courtney D Heinle

*Assistant Examiner* — John S Hunter, Jr.

(74) *Attorney, Agent, or Firm* — Vitale, Vickrey, Niro, Solon & Gasey LLP

(57) ABSTRACT

A fan blade apparatus for use in a high-volume, low-speed fan wherein the fan blade includes a body portion, a leading edge portion and a trailing portion. The fan blade coupled to an electric motor configured to rotate in an intended direction wherein the leading portion of the fan blade is at the forefront of the rotation of the blade. The leading edge portion of the fan blade includes a series of steps extending along the length of the leading edge. The stepped configuration creates turbulent air flow when the electric motor rotates in the intended direction.

19 Claims, 9 Drawing Sheets

STEPPED LEADING EDGE FAN BLADE

PRIORITY DOCUMENT

The present application is a continuation application claiming priority from U.S. patent application Ser. No. 17/521,037 which was filed on Nov. 8, 2021 and issued on Jul. 11, 2023 as U.S. Pat. No. 11,698,081 which is a continuation application claiming priority from U.S. patent application Ser. No. 16/569,010 which was filed on Sep. 12, 2019 and issued on Nov. 9, 2021 as U.S. Pat. No. 11,168,703 which is a continuation claiming priority from prior application Ser. No. 14/814,161 which was filed on Jul. 30, 2015, now U.S. Pat. No. 10,428,831 issued Oct. 1, 2019.

FIELD OF THE INVENTION

The present invention relates generally to the design of a fan blade. More particularly, the present invention pertains to the design of the leading edge of the fan blade wherein the leading edge has regular steps at a predetermined ratio configured to create turbulent airflow.

BACKGROUND OF THE INVENTION

The indoor environment is a significant concern in designing and building various structures. Human and occupant comfort are largely affected by airflow, thermal comfort and relevant temperature. Airflow is generally the measurable movement of air across a surface. Relevant temperature is the degree of thermal discomfort measured by airflow and temperature. Airflow that improves employee health and productivity can have a large return on investment. High-volume, low-speed ceiling and vertical fans can provide significant energy savings and improve occupant comfort in large commercial, industrial, agricultural and institutional structures. High-volume low-speed (HVLS) fans are the newest ventilation option available today. These large fans, which range in size from 8 to 24 feet, provide energy-efficient air movement throughout a large volume building at a fraction of the energy cost of high-speed fans.

The main advantage of an HVLS fan is its limited energy consumption. One 20-foot fan typically moves approximately 125,000 cubic feet per minute (cfm) of air. It takes six to seven standard fans to provide a similar volume of air movement. An eight-foot fan can move approximately 42,000 cfm of air. Most HVLS fans employ a 1 to 2 HP motor, moving the same volume of air (for approximately one-third of the energy cost) of six high-speed fans.

HVLS fans move large columns of air at a slow velocity, about 3 mph (260 fpm). Air movement of as little as 2 mph (180 fpm) has been shown to provide a cooling effect on the human body according to the Manual of Naval Preventive Medicine. In fact, airflow at 2 mph will give a cooling effect of approximately 5° F. (the air feels 5° F. cooler) and an airflow of 4 mph will provide a cooling effect of approximately 10° F.; that is if the actual temperature was 75° F. with an airflow of 4 mph, the relative temperature would be 65°. The cooling effect is described as the retentive temperature. Moreover, it has been shown that turbulent airflow provides a more-effective cooling sensation than uniform airflow.

A study done by the University of Wisconsin shows that HVLS systems provide more widespread air movement throughout the building or space to be cooled. One disadvantage of traditional HVLS fans is that they have an area of "dead" air (air that has minimal air movement) in close proximity to the centerline of the fan.

Although high-speed fans provide more velocity, each unit impacts only a small, focused area. High-speed fans are good for managing extreme heat, although they can cause a dramatic increase in energy consumption in the hot, summer months. High-speed fans produce higher velocities in the area directly surrounding each fan, leaving large areas of dead air outside the diameter of the fan blades.

HVLS systems are sometimes used year-round. In summer, HVLS fans provide essential cooling; in winter, the fans move drier air from ceiling to floor level and may result in a more comfortable environment. HVLS fans are virtually noiseless. HVLS fans provide more comfort to individuals positioned in proximity to the fan, because the airflow causes a lower relevant temperature—that is, the air temperature feels cooler because of the movement of the air. The optimal airflow velocity for HVLS fans is typically between 2 to 4 miles per hour for most operations. Spacing the fans too far apart will significantly diminish the system's benefits.

HVLS fans cost approximately $4,200-$5,000 each, including installation. While this is a large upfront investment, facility must use six to seven high-speed fans at $200-$300 each to move the same volume of air as with one HVLS fan. Energy savings realized through the use of HVLS fans over a high-speed fan system should make up the cost difference within two to three years. Manufacturers claim that HVLS fans typically do not require replacement for at least 10 years. Because high-speed fans operate a higher RPM, the motors typically need to be replaced more frequently than with HVLS fans.

The components of a typical fan include:

An electromagnetic motor;

Blades also known as paddles or wings (usually made from wood, plywood, iron, aluminum or plastic);

Metal arms, called blade mounts (alternately blade brackets, blade arms, blade holders, or flanges), which hold the blades and connect them to the motor;

A mechanism for mounting the fan to the ceiling.

There are axial flow fan blades available in the prior art that address the issue of increasing the efficiency of a fan. For example, U.S. Pat. Nos. 4,089,618, 5,603,607 and 5,275,535 all pertain to fan blades in which the trailing edges contain notches or a saw-tooth shape. Additionally, in U.S. Pat. No. 5,275,535, both the leading and the trailing edges are notched. Moreover, U.S. Pat. Nos. 5,326,225 and 5,624,234 disclose fan blade platform shapes that are curved forward and backward. Despite the fact that the referred patents may present a reduction in the noise level and an increase on the efficiency, the improvement obtained is quite modest. Consequently, the applicability of these patents is limited in actual practice. Another prior art technology, as depicted in U.S. Pat. No. 8,535,008, utilizes a leading edge which includes a series of spaced "tubercles" formed along the leading edge of the rotor blade.

None of the prior art shows a stepped blade configuration along the leading edge of a fan blade. There is a need for a stepped leading edge fan blade design that creates turbulent airflow and delivers an increased velocity over a greater area.

SUMMARY OF THE INVENTION

It has been determined that turbulent airflow is more effective at providing a cooling sensation than uniform airflow. The present invention incorporates a stepped design on the leading edge of the fan blade. The leading edge of the fan blade is stepped such that the widest portion of the blade is located closest to the hub of the fan. The leading edge is stepped down from the hub at predetermined intervals such that the width of the overall fan blade decreases at each step. The present invention includes a leading edge which extends beyond the generally uniform width of a typical fan blade. The steps may be of equal length whereby the first step closest to the hub is the same length as the other steps. Thus, a preferred ratio of the width of the steps of the leading edge in the present invention is approximately 3:2:1. By way of example, the leading edge may be an additional three inches from the width of the body portion in a typical fan blade, the second step is an additional two inches from the width of the body portion of a typical fan blade and the third step is an additional one inch from the width of the body portion of a typical fan blade. The steps provide for increased turbulent airflow. While the steps may be of any proportion, it appears that steps of uniform proportion create the optimal turbulent airflow.

One of the benefits of having a stepped leading edge on the fan blade is that movement of the blade creates greater airflow velocity than the existing fan blade.

Another advantage of the stepped design is that it provides for a more balance airflow and greater coverage area.

Yet another advantage of the present invention is a greater velocity of airflow in the "dead area" below the centerline of the fan. In a typical fan blade design, the area directly under the hub of the fan to a distance of approximately twenty feet from the hub does not receive a significant amount of airflow. This area was known as the "dead area." The stepped configuration of the leading edge of the present invention provides for airflow within the dead spot; that is the fan blade of the present invention has a dead spot of less than three feet.

Additionally, the design of the present invention provides the benefit of extending the effective range of air movement an additional 8-9 feet beyond the range of a fan having standard saw blades. Advantage that with a stepped leading edge, the angle of the blade can be up to 22° whereas typical HVLS fans are between 10° to 15°.

DESCRIPTION OF THE FIGURES

Other objects and advantages of the invention will become apparent upon reading the following detailed description and upon reference to the following drawings.

DETAILED DESCRIPTION OF THE PREFERRED EMBODIMENTS OF THE INVENTION

A typical high volume low speed fan has between four to eight fan blades. The fan blades are typically between 4-feet to 12-feet in length and have a width of 6 inches, Thus, the total diameter of a typical fan is between 8-feet (96 inches) to 24-feet (288 inches).

Figure 1:
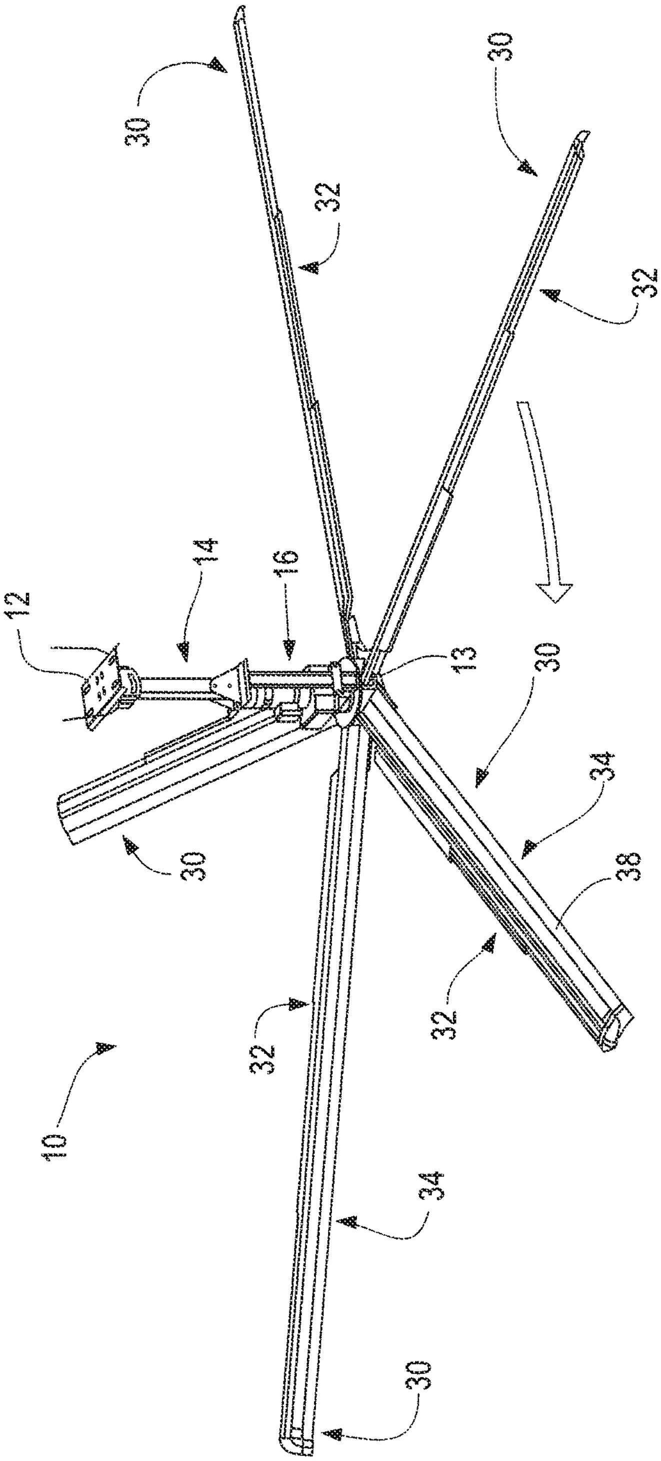
FIG. 1 is a perspective view of the fan of the present invention.
Figure 2A:
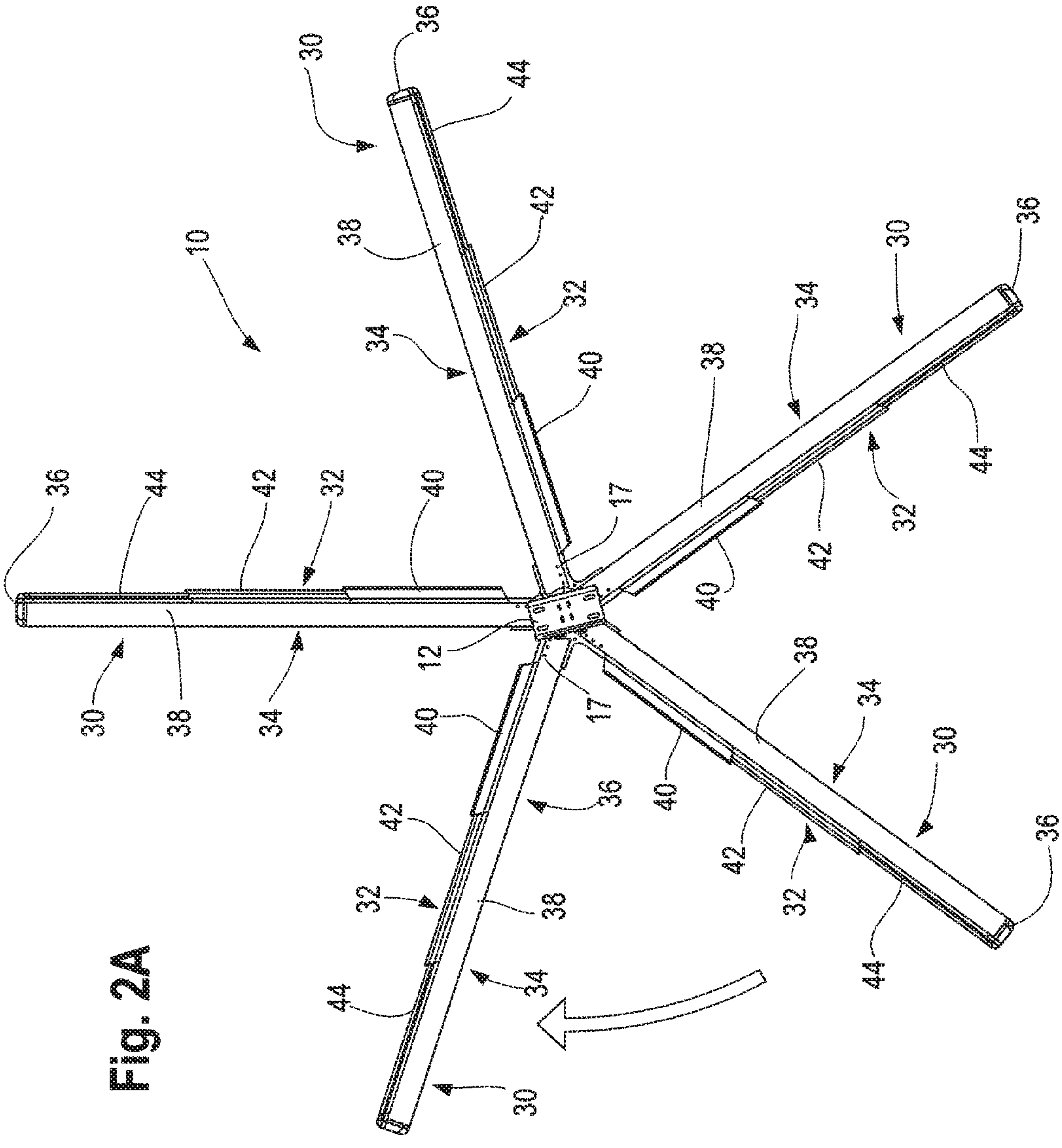
FIG. 2A is a top plan view of the fan.
Figure 2B:
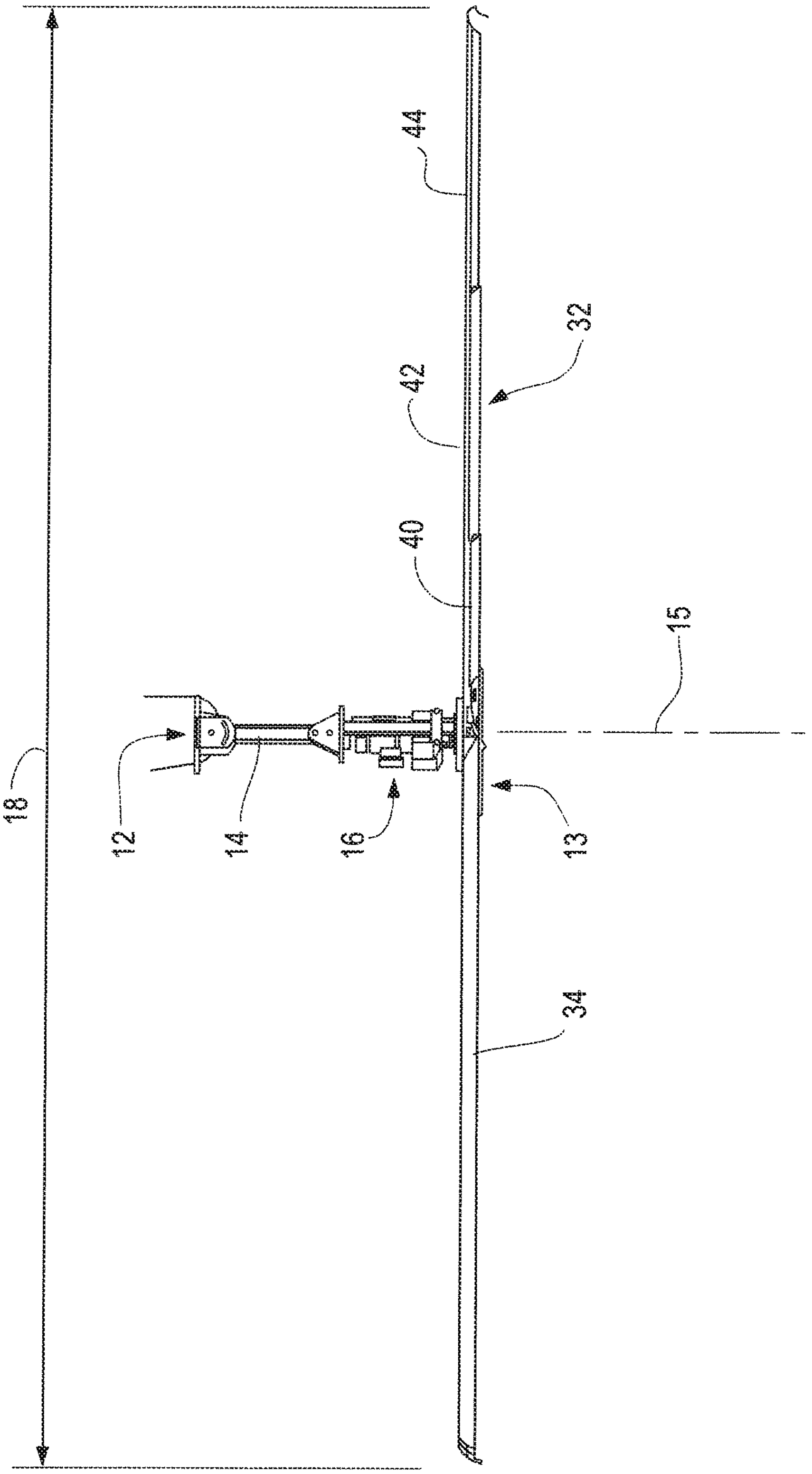
FIG. 2B is a side elevation view of a fan of the present invention showing the step design.

In the preferred embodiment of the present invention, as shown in FIGS. 1, 2A and 2B, the fan 10 is mounted to a ceiling (not shown). The fan 10 is mounted to the ceiling using a standard mount such as a universal I-Beam clamp with a swivel 12. The fan 10 may include an optional drop extension 14 that is 1 foot, 2 foot, 4 foot or more in length, depending upon the distance from the ceiling to the floor. At the end of the drop extension 14 is a gear motor 16. The motor 16 is typically an electromagnetic motor. The horsepower of the motor varies depending upon the diameter of the entire fan 18. For example, an 8-foot and 12-foot fan typically has a 1 horsepower motor 16. The 16-foot fan typically includes a 1.5 horsepower motor 16, and a 20-foot and 24-foot fan typically has a 2.0 horsepower motor 16. Attached to the motor 16 is a fan blade mount 13 that has a centerline 15 at the center of the fan 10 and motor 16. The fan blade mount 13 connects a fan blade 30 to the motor 16. The fan blade 30 is typically affixed to the fan blade mount 13 by means of a plurality of fasteners such as a bolt, screw, pin, rivet or the like.

Figure 3A:
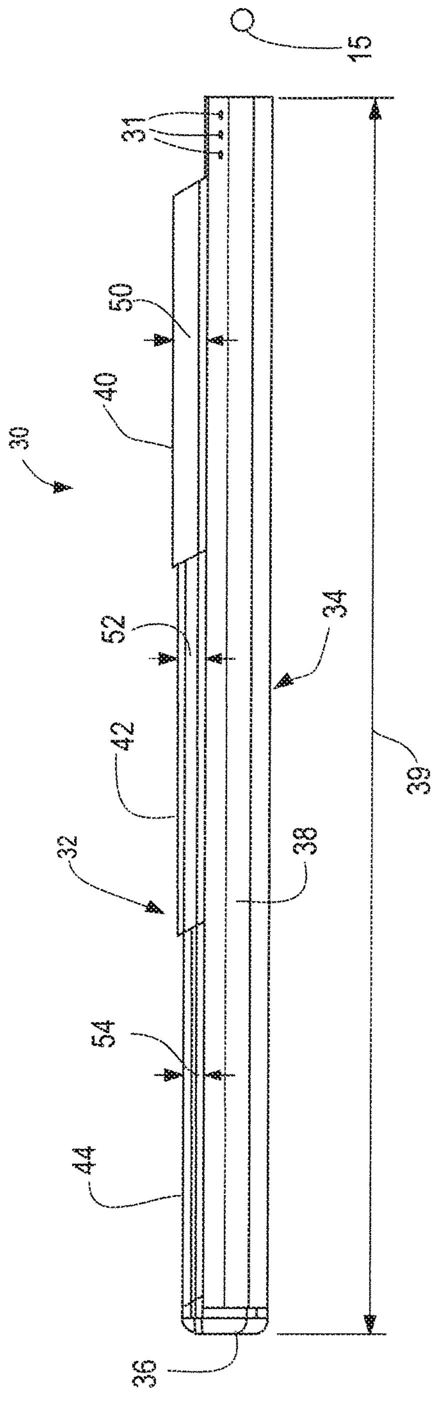
FIG. 3A is a top plan view of a fan blade of the present invention showing the stepped design.

The preferred embodiment shown in FIGS. 1, 2A and 2B includes five fan blades 30, however, there may be a greater number of fan blades, or there may be less than five fan blades. Each fan blade 30 has a leading edge 32, and a trailing edge 34 and an end cap 36. The fan blade 30 includes a blade body 38. The blade body 38 is typically made of an extruded aluminum alloy, but could be made of a composite metal, carbon fiber material, a graphite material, fiberglass, wood or other similar material. The leading edge 32 of the fan blade has steps 40, 42, 44 (as shown in FIGS. 2A and 3A) from the portion of the leading edge 32 fan blade 30 positioned closest to the centerline 15 of the fan blade mount 13.

The stepped configuration of the leading edge 32 of the fan blade is shown in more detail in FIGS. 2A, 2B, 3A, 3B, 4 and 5A. The leading edge 32 of the fan blade 30 has a first step 40, a second step 42 and a third step 44. The steps extend from the blade body 38. The leading edge 32 of the fan blade 30, including the first step 40, the second step 42 and the third step 44, are preferably made of an extruded polymer material, such as high-impact polystyrene, but may be constructed of a composite plastic material, graphite, fiberglass, carbon fiber, aluminum or any material having similar features and properties to the identified materials.

The steps 40, 42 and 44 preferably have generally equal lengths proportional to the length of the blade body 38. Thus, the first step 40 would be approximately ⅓ the total length 39 of the blade body 38. The second step would also be approximately ⅓ the total length 39 of the blade body 38. Likewise, the third step would be approximately ⅓ the total length 39 of the blade body 38. The steps 40, 42 and 44 have a width in a ratio of 3:2:1. Thus, the distance that the first step 40 extends 50 beyond the front edge of the blade body 38 is 3-inches; the distance the second step 42 extends 52 is 2-inches and the third step 44 extends 54 is 1-inch. Thus, the ratio of the distance the various steps 40, 42 and 44 extend beyond the front edge of the blade body 38 is 3:2:1. While the preferred embodiment has steps of proportional length and proportional width, it is not a requirement. The important aspect of the step configuration is that the leading edge has multiple steps, from the area of the fan blade 30 closest to the hub. The steps decrease the thickness of the blade in each step that proceeds from the hub.

Figure 3B:
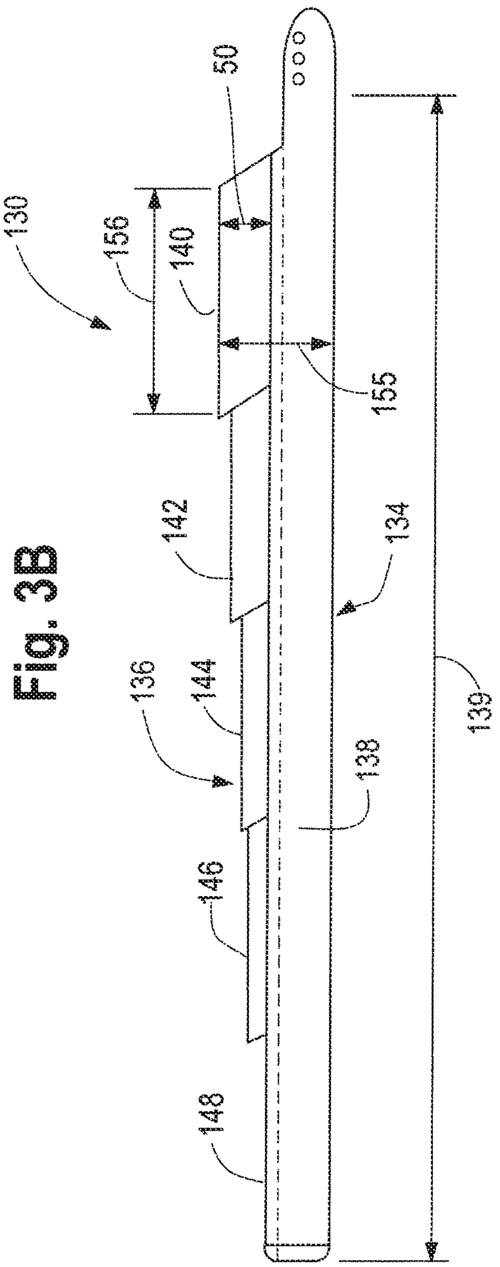
FIG. 3B is a top plan view of an alternative design of the fan blade of the current invention that includes five steps.

While the preferred number of steps is three with a ratio of 3:2:1, the number of steps may be more than three, so long as the ratio of length of the steps corresponds to the number of steps and the distances the various steps extend beyond the front edge of the blade body is a ratio equal to the number of steps. FIG. 3B shows a blade that has five steps. By way of example, a 20-foot diameter fan would have a fan blade 130 of approximately 10-foot in length 139. The ratio of the steps along the leading edge 136 in the preferred embodiment would be 5:4:3:2:1. Each step 140, 142, 144, 146, and 148 would be approximately 2 feet in length 156. The overall fan width 155 should not exceed 9-inches in the preferred embodiment. A fan blade 130 that exceeds a width of 9-inches may cause an undesirable load to be placed on the motor. It is, of course, possible for the distance to be greater than 9-inches if one chooses to construct a fan using a non-conventional fan motor. In the above example of the 5-step fan blade, the distance from the front edge of the fan body 138 to the leading edge of the step 140 should not necessarily exceed 3 inches. In the embodiment of a 5-step fan blade (FIG. 3B), the distance of the first step 50 would be approximately 3-inches, Each step would then decrease by 6/10 of an inch. The fan blade 130 has a trailing edge 134 as the fan blade 130 rotates.

Figure 4:
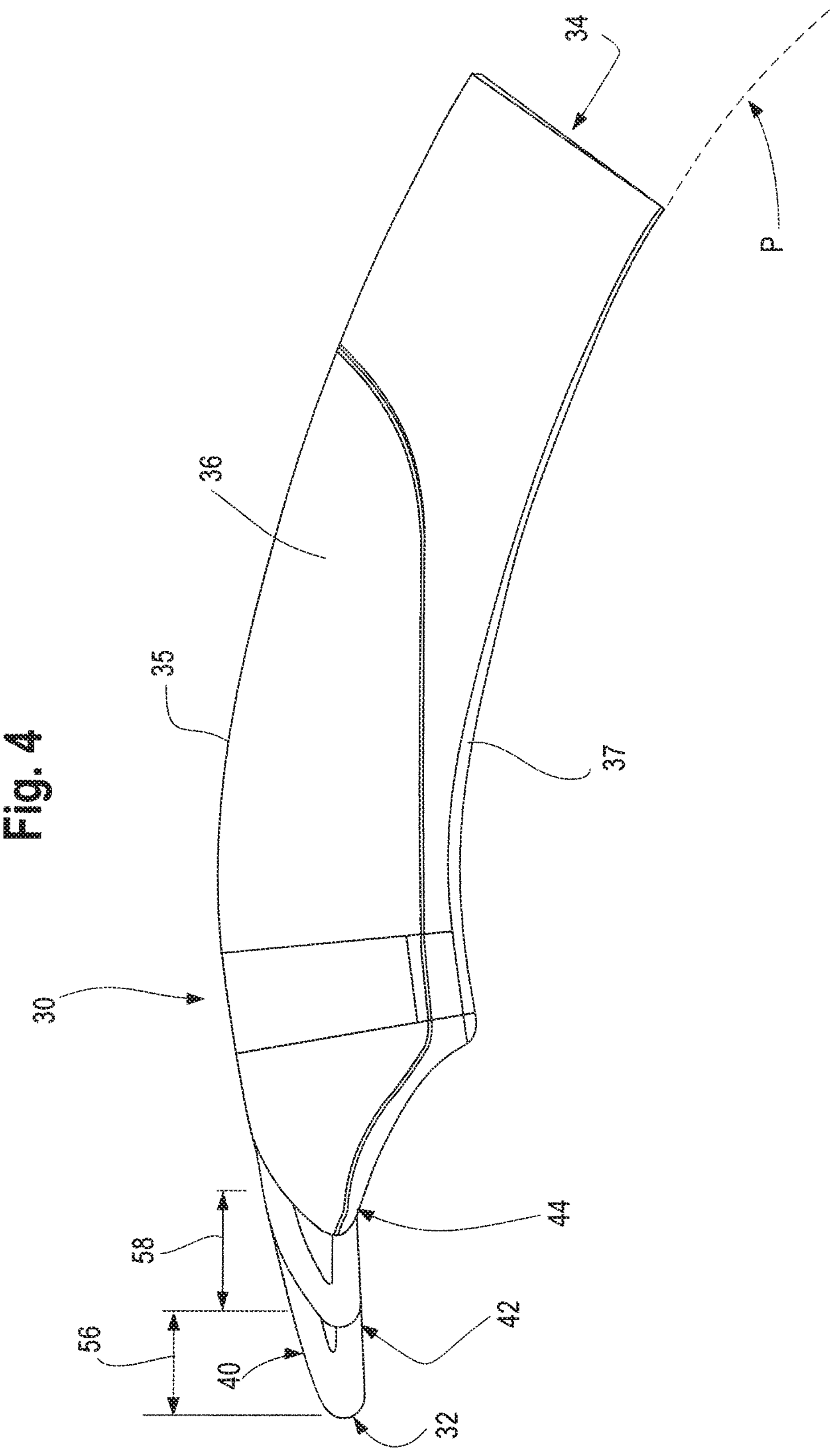
FIG. 4 is a side view of the fan blade of the present invention.
Figure 5A:
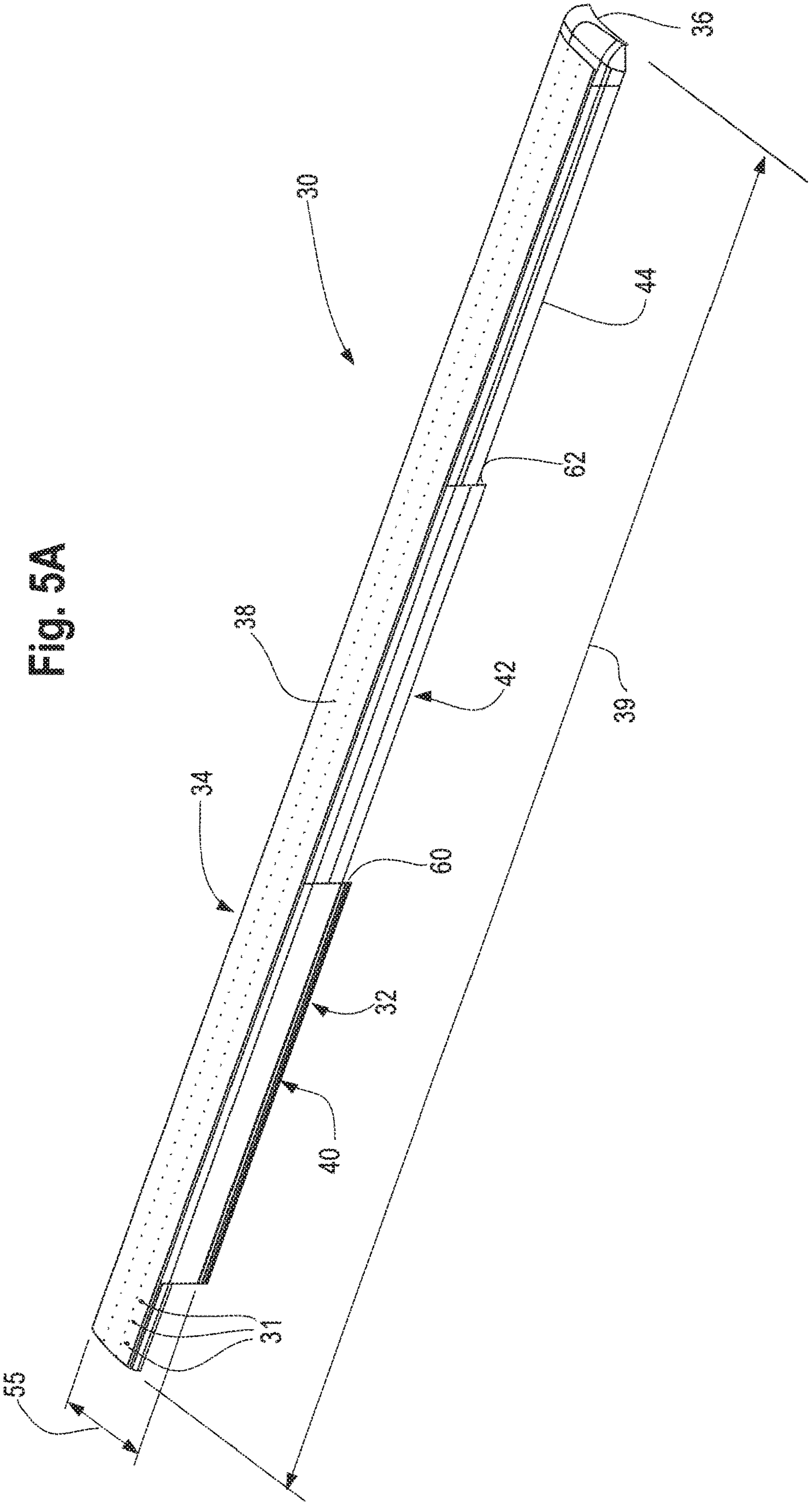
FIG. 5A is a perspective view of a fan blade of the current invention showing three steps.

FIG. 4 is a side view of one of the preferred embodiments of the fan blade of the present invention which has 3 steps. The blade 30 includes a leading edge 32, a body 36 and a trailing edge 34. The leading edge 32 includes a series of steps 40, 42 and 44. The distance between the first step 40 and the second step 42 of the leading edge 32 is shown as 56. Likewise, the distance between the second step 42 and the third step 44 is shown as 58. The blade 30 has an upper portion 35 and a lower portion 37. The blade 30 also has a rearward portion 34. The steps 40, 42 and 44 along the leading edge 32 of the blade 30 provide vortex along the edge of the steps 60 and 62 as shown in FIG. 5A. The vortex created at the edges of the steps 60 and 62 create a greater turbulent airflow below the fan. The vortex created at the edges of the steps 60 and 62 also provide for greater airflow velocity in the area near the centerline 15 of the fan.

The pitch P of the blade 30 along the top and bottom portion of the blade is approximately 22°. The design of the steps 40, 42 and 44 along the leading edge 32 of the blade 30 permits for the blade to accommodate up to a 22° pitch. Conventional HVLS fans typically have a pitch for the blade between 10°-15°. The stepped design of the leading edge of the fan blade allows for a pitch between 18° to 22° to be implemented without increasing the strain of the motor. The increased pitch promotes more downward airflow.

Figure 5B:
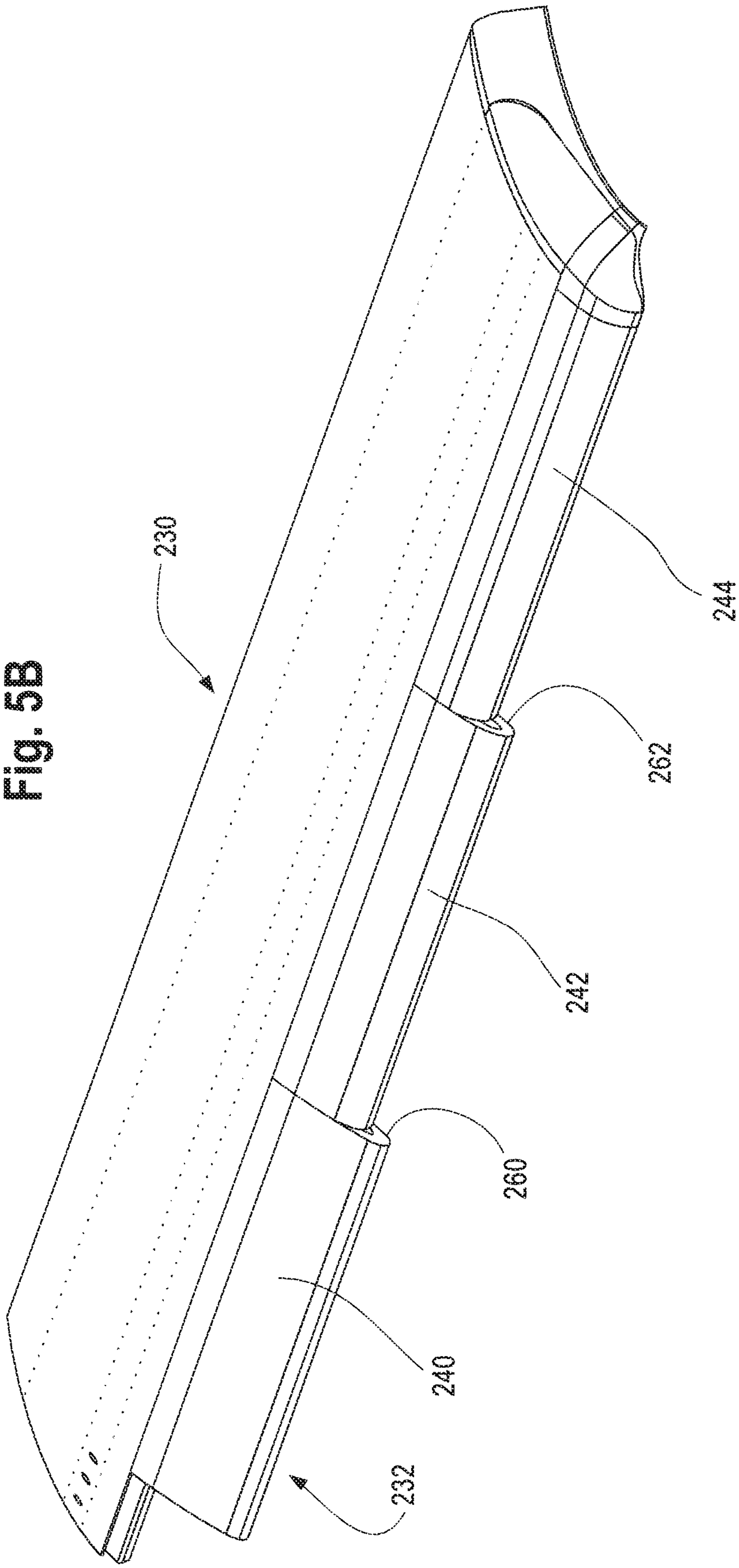
FIG. 5B is a perspective view of an alternate embodiment of the fan blade of the present invention.

The steps 40, 42 and 44 along the leading edge 32 of the fan blade 30 have edges 60 and 62 respectively. The edges 60 and 62 of the preferred embodiment have a recessed or Z-shaped configuration. This configuration is for aesthetic purposes. As shown in FIG. 5B, the steps 240, 242 and 244 have edges 260 and 262 that are at approximately a 90° angle to the leading edge 232 of the fan blade 230. The configuration of the edges 260 and 262 does not affect the function of the fan blade 230.

An actual embodiment of the preferred invention was tested at a warehouse facility in Beaver Dam, Wisconsin. The height of the facility was twenty-five feet from the floor to the ceiling. The high-velocity, low speed fan was a 24-foot diameter fan that was mounted twenty feet from the floor—in other words, the fan had approximately a five-foot drop from the ceiling. The fan had five blades including three steps on each blade as depicted in FIGS. 3A, 3B and 4. The average velocity of the air was measured using a wind velometer gauge. The air velocity was measured at a height of 48-inches above the level of the floor. Measurements were taken at various distances, at approximately three-foot intervals, from the centerline 15 of the fan. Measurements were taken at each location using the wind velometer gauge over a time period of approximately thirty seconds. Because the airflow is not constant, the maximum and minimum airflow measurements were recorded over the thirty second period. The maximum and minimum velocity readings over the thirty second period were averaged and are set forth in the chart below:

| Distance from Center of Fan (Feet) | Velocity (Miles Per Hour) |
|---|---|
| 3 | 2.3 |
| 6 | 3.0 |
| 9 | 4.0 |
| 12 | 2.8 |
| 15 | 4.0 |
| 20 | 3.0 |
| 23 | 3.1 |
| 26 | 2.3 |
| 30 | 1.9 |
| 33 | 2.9 |
| 36 | 3.0 |
| 42 | 2.0 |
| 46 | 2.7 |
| 50 | 2.0 |
| 53 | 1.9 |
| 58 | 1.1 |
| 62 | 1.1 |

Figure 6:
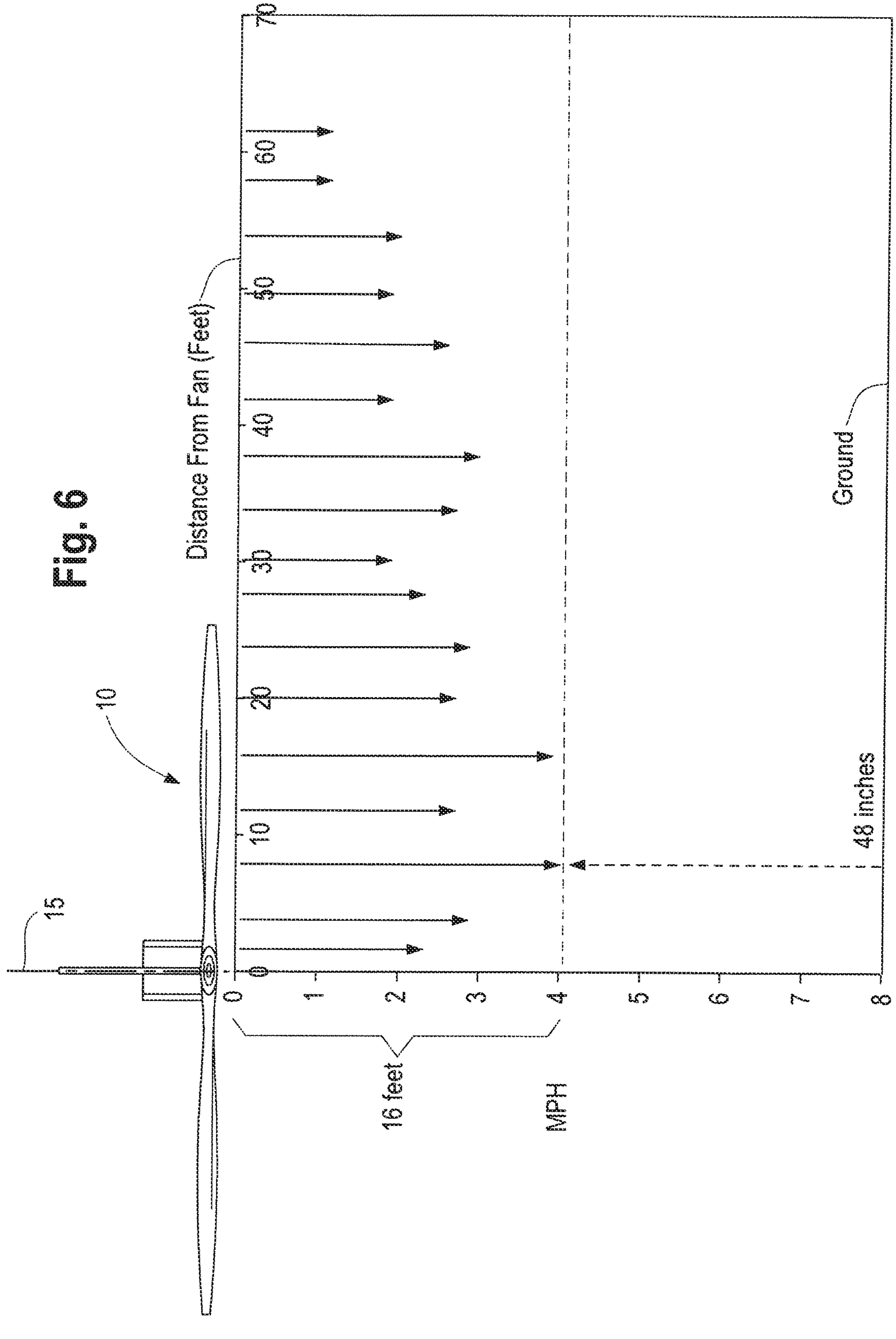
FIG. 6 is graph of air speed versus distance from the center of the fan.

FIG. 6 is a graph of the average velocity in MPH of airflow created by the circulation of the fan 10 utilizing the blades 30 of the preferred embodiment at various distances from the centerline 15 of the fan. As shown in FIG. 6, for example, at approximately 8-feet and 16-feet from the centerline 15 of the fan, the average velocity of airflow 48-inches above the ground was 4 miles per hour. The human body typically feels 6 to 10° F. cooler (Relative Temperature) than the ambient temperature of the air when the air is circulating at 4 miles per hour. At airflow at a velocity of 2 miles per hour, the human body fees 3 to 5° cooler than the ambient temperature of the air. The benefit of the fan design is a greater velocity of air circulation is achieved within close proximity to the centerline 15 of the fan. In addition, the measureable air circulation extends to a distance of 62-feet from the centerline 15 of the fan 10.

This chart shows that the stepped design has significant airflow coverage and overall air dispersion. The fan of the current invention has minimal airflow dead spots, especially within close proximity to the centerline of the fan.

The fundamental operating principals and indeed many of the engineering criteria of fan blades for high-volume low-speed ceiling fans is similar to fan blades used in basically all forms of compressors, fans and turbine generators. In other words, the rotor blades can be used in a huge range of products such as for example, for helicopter blades, car fans, air conditioning units, water turbines, thermal and nuclear steam turbines, rotary fans, rotary and turbine pumps, and other similar applications.

Although embodiments of the present invention have been described, those of skill in the art will appreciate that variations and modifications may be made without departing from the spirit and scope thereof as defined by the appended claims.

What is claimed is:

1. A high-volume, low-speed fan comprising:
a ceiling mount comprising an I-beam clamp including a swivel;
a drop extension mounted to the ceiling mount;
an electric motor enclosed in a motor housing wherein the motor housing is affixed to the drop extension;
a fan blade mount affixed to the electromagnetic motor wherein the motor rotates around an axis of rotation;
a plurality of fan blades coupled to the fan blade mount each of the plurality of fan blades having a length measurable along a longitudinal edge of the fan blade and a width measurable along an end edge of the fan blade;
a leading edge attached to the longitudinal edge of the fan blade, the leading edge comprising a plurality of steps including a first step and a last step extending along a length of the leading edge at predetermined intervals, wherein a width of the first step is narrower than a width of the last step, the plurality of steps each have a straight portion positioned parallel to the longitudinal edge of the fan blade, and
the plurality of steps each include a foremost edge surface wherein the foremost edge surface of each of the plurality of are aligned in a plane formed by a chord direction of the fan blade and a non-axial transverse direction of the fan blade;
and the plurality of steps of each of the fan blades are each configured to create a vortex.

2. The high-volume, low-speed fan of claim 1, wherein the drop extension has a length measured between the ceiling mount and the fan motor, wherein the length of the drop extension is between 1 foot and 4 feet.

3. The high-volume, low-speed fan of claim 1, wherein the drop extension has a length measured between the ceiling mount and the fan motor, wherein the length of the drop extension is 2 feet.

4. The high-volume, low-speed fan of claim 1, wherein the drop extension has a length measured between the ceiling mount and the fan motor, wherein the length of the drop extension is 4 feet.

5. The high-volume, low-speed fan of claim 1, wherein the plurality of fan blades comprises 2 fan blades.

6. The high-volume, low-speed fan of claim 1, wherein the plurality of fan blades comprises 3 fan blades.

7. The high-volume, low-speed fan of claim 1, wherein the plurality of fan blades comprises 4 fan blades.

8. The high-volume, low-speed fan of claim 1, wherein the plurality of fan blades comprises 5 fan blades.

9. The high-volume, low-speed fan of claim 1, wherein the plurality of steps comprises the first step and a second step.

10. The high-volume, low-speed fan of claim 1, wherein the plurality of steps comprises a first step, a second step and a third step.

11. The high-volume, low-speed fan of claim 1, wherein the plurality of steps comprises the first step, a second step, a third step, a fourth step and the last step.

12. The high-volume, low-speed fan of claim 1, wherein the length of each of the plurality of fan blades is 8 feet.

13. The high-volume, low-speed fan of claim 1, wherein the length of each of the plurality of fan blades is 12 feet.

14. The high-volume, low-speed fan of claim 1, wherein each of the plurality of fan blades have a top surface and each of the plurality of steps comprising a step edge between each of the plurality of steps, the step edge between each of the plurality of steps is configured to form a Z-shaped step edge along the top surface of the fan blades.

15. The high-volume, low-speed fan of claim 1, wherein each of the plurality of fan blades have a top surface and each of the plurality of steps comprising a step edge between each of the plurality of steps, the step edge between each of the plurality of steps is configured to form a recessed step edge along the top surface of the fan blades.

16. The high-volume, low-speed fan of claim 1, wherein each of the plurality of fan blades have a top surface and each of the plurality of steps comprising a step edge between each of the plurality of steps, the step edge between each of the plurality of steps is configured at a 90° angle to the leading edge along the top surface of the fan blades.

17. A fan blade comprising:
a body portion having a hub side, an exterior side, a top surface, and a leading edge portion measurable along a longitudinal edge of the fan blade;
a tail portion measurable along a trailing edge portion of the fan blade;
the body portion having a width measurable between the leading edge portion and the trailing edge portion;
a leading edge forming a plurality of steps including at least a first step, a second step, and a third step along a length of the leading edge wherein each of the plurality of steps decreases in a width edge of the fan blade between the leading edge and the trailing edge portion wherein the first step and second step comprising a first step edge that is configured to form a Z-shaped first step edge along the top surface and the second step and third step comprising a second step edge that is configured to form a Z-shaped second step edge along the top surface;
the plurality of steps including a first air contact surface a second air contact surface, and a third air contact surface wherein the first air contact surface corresponds to the first step, the second air contact surface corresponds to the second step and the third air contact surface corresponds to the third air contact surface and are aligned in a plane formed by a chord direction of the fan blade and a non-axial transverse direction of the fan blade; and
the plurality of steps are each configured to create a vortex.

18. The fan blade of claim 17 wherein the first step of the plurality of steps is positioned along the leading edge closest to a centerline and the third step is positioned along the leading edge furthest to the centerline.

19. The fan blade of claim 18, wherein each of the first step, the second step, and third step are configured to be an equal length along the leading edge portion of the fan blade portion such that each of the first step, the second step, and the last step is proportional to a total length of the leading edge of the fan blade.

* * * * *